(12) United States Patent  
Hara (10) Patent No.: US 7,793,913 B2  
(45) Date of Patent: Sep. 14, 2010

(54) VALVE ELEMENT OPENING/CLOSING DEVICE

(75) Inventor: Tetsuhiko Hara, Nagano (JP)

(73) Assignee: Nidec Sankyo Corporation (JP)

( * ) Notice: Subject to any disclaimer, the term of this patent is extended or adjusted under 35 U.S.C. 154(b) by 520 days.

(21) Appl. No.: 11/832,141

(22) Filed: Aug. 1, 2007

(65) Prior Publication Data

US 2008/0029724 A1 Feb. 7, 2008

(30) Foreign Application Priority Data

Aug. 1, 2006 (JP) ............................. 2006-209448
Aug. 1, 2006 (JP) ............................. 2006-209449

(51) Int. Cl.
*F16K 31/02* (2006.01)

(52) U.S. Cl. .................. 251/129.11; 251/251; 251/253

(58) Field of Classification Search ................ 251/251, 251/252, 253, 254, 129.11, 129.12, 129.13, 251/333

See application file for complete search history.

(56) References Cited

U.S. PATENT DOCUMENTS 3,015,963 A * 1/1962 Terry ............................. 74/44
5,996,966 A * 12/1999 Zimmerly ................. 251/357
6,007,047 A * 12/1999 Phipps ....................... 251/252
6,534,793 B1 * 3/2003 Heritier-Best ............... 257/77
6,886,546 B1 * 5/2005 Bircann et al. .......... 123/568.23
7,204,271 B2 * 4/2007 Kasai et al. ............. 137/625.46

FOREIGN PATENT DOCUMENTS

JP 2003-148645 5/2003
JP 2004-293573 10/2004

* cited by examiner

*Primary Examiner*—John K Fristoe, Jr.
(74) *Attorney, Agent, or Firm*—Cantor Colburn LLP (57) ABSTRACT

A valve element opening/closing device may include a valve element for opening and closing an opening part, a drive mechanism for operating the valve element, and a motor for the drive mechanism. The drive mechanism may include a cam engagement part formed in the valve element, and a cam member rotationally driven by the motor. A cam face is formed in the cam member to be inclined to a direction of a rotation center axis of the cam member and engaged with the cam engagement part, and a turning preventing part restricting turning of the valve element is provided to move the valve element linearly. Further, the opening part may include a hollow pipe, a plate provided with a mounting hole into which the pipe is inserted, and a valve seat. The valve seat is provided with a projecting part and the brazing material is restricted to flow out to an abutting face of the valve seat by the projecting part.

18 Claims, 10 Drawing Sheets

VALVE ELEMENT OPENING/CLOSING DEVICE

CROSS REFERENCE TO RELATED APPLICATION

The present invention claims priority under 35 U.S.C. §119 to Japanese Application No. 2006-209448 filed Aug. 1, 2006 and Japanese Application No. 2006-209449 filed Aug. 1, 2006, both of which are incorporated herein by reference.

FIELD OF THE INVENTION

An embodiment of the present invention may relate to a valve element opening/closing device. More specifically, an embodiment of the present invention may relate to a valve element opening/closing device in which a valve element is operated by a motor to open and close a flow path.

BACKGROUND OF THE INVENTION

A valve element opening/closing device has been conventionally known in which a valve element is driven by a motor as a drive source to open and close a flow path for refrigerant of a refrigerator or the like. For example, in Japanese Patent Laid-Open No. 2003-148645 (first patent reference), a valve element opening/closing mechanism of a so-called linearly moving drive type valve element is described in which a needle valve is attached to a screw member, and the screw member is rotated by a motor to advance and retreat in an axial direction. Thus, an opening from which refrigerant flows out is opened or closed.

Further, in Japanese Patent Laid-Open No. 2004-293573 (second patent reference), an opening/closing mechanism of a valve element is described in which a disk valve provided with an opening part is rotated by a motor, and when the opening part of the disk valve is coincided with one of outflow ports provided in a valve seat plate, the corresponding outflow port is in an opened state.

However, in the above-mentioned first patent reference, the moving amount of the screw member in the axial direction with respect to rotation amount of the motor is required to be controlled accurately. Therefore, a male screw part and a female screw part with a high degree of accuracy are required in the screw member and a cylindrical part with which the screw member is threadedly engaged. Therefore, mass-productivity is low. In addition, since a moving amount in the axial direction of the screw member per rotation of the motor is small, the number of motor rotations required to move the needle valve to open/close increases. Thus, energy efficiency is low and response of an opening/closing operation of the valve element is slow.

Further, in the above-mentioned second patent reference, the disk valve is disposed to face-contact with the valve seat plate which is provided with the outflow port, which is different from the case where the valve element linearly moves to open and close the outflow port for refrigerant as described in the first patent reference. However, in this case, the starting performance of the valve element opening/closing device is lowered by a frictional force due to sliding of the disk valve on the valve seat plate.

Further, the valve seat which is used in the above-mentioned valve element opening/closing devices is often fixed to a plate in the valve element opening/closing device by brazing. Therefore, brazing material flowing into a space between the valve seat and the plate may flow out to an abutting face of the valve seat with the valve element to cause roughness of the abutting face to increase. Accordingly, the sealing property at the time of abutting of the valve element with the valve seat, which is secured by polishing or the like, is deteriorated and the abutting face of the valve element with the valve seat may be damaged by an edge of the brazing material adhered to the abutting face of the valve seat.

SUMMARY OF THE INVENTION

In view of the problems described above, an embodiment of the present invention may advantageously provide a valve element opening/closing device in which a valve element is linearly moved, parts with a high degree of precision are not required in an opening/closing mechanism for the valve element, response performance of an opening/closing operation of the valve element is satisfactory, and sliding friction between abutting faces of the valve element and an opening port for fluid does not occur.

Further, in view of the problems described above, another embodiment of the present invention may advantageously provide a valve element opening/closing device in which, when a valve seat disposed at a fluid outflow or inflow opening part is mounted on a plate by brazing, brazing material is prevented from flowing out to an abutting face of the valve seat with the valve element to be capable of securing opening/closing operation of a flow path.

Thus, according to an embodiment of the present invention, there is provided a valve element opening/closing device including an inflow part into which fluid is capable of flowing, an outflow part from which the fluid is capable of flowing out, opening parts which are provided in the inflow part and the outflow part, a valve element for opening and closing at lease one of the opening parts, a drive mechanism for operating the valve element to change the opening part in an open state or in a closed state, and a motor which is a drive source for the drive mechanism. In this valve element opening/closing device, the drive mechanism includes a cam engagement part which is formed in the valve element, a cam member which is rotationally driven by the motor, a cam face which is formed in the cam member so as to be inclined with respect to a direction of a rotation center axis of the cam member and engaged with the cam engagement part, and a turning preventing part which restricts turning of the valve element due to rotational drive of the cam member to move the valve element linearly. Therefore, the valve element is linearly moved in parallel with the rotation center axis of the cam member through the cam engagement part of the valve element which receives a moving force along the cam face formed in the cam member together with rotation of the cam member.

According to the valve element opening/closing device described above, when the cam member having the cam face inclined with respect to the direction of the rotation center axis is rotated by the motor as a drive source, the valve element, which is engaged with the cam face through the cam engagement part, receives a force to move along the cam face of the cam member. However, since operation of the valve element in a rotating direction is restricted by the turning preventing part, the valve element is moved in parallel with the rotation center axis of the cam member. Therefore, the valve element is not slid on the opening part for fluid and thus starting performance of the valve element is not deteriorated by friction and the valve element does not wear. Further, since the inclined shape of the cam face can be freely set, opening/closing of the valve element is performed with less rotations of a motor, and thus, a valve element opening/closing device can be obtained which is superior in response performance of an opening/closing operation of the valve element.

In this case, the valve element described above may be a valve element for opening and closing an opening part formed in the outflow part.

In the embodiment described above, it is preferable that a rotor of the motor is movably held in a direction of the rotation center axis of the cam member and an urging member is provided for urging the valve element in a direction that the opening part is maintained in the closed state. The valve element is urged by the urging member so as to surely close the opening part through the rotor and the cam member when the opening part is in the closed state. As described above, when the rotor is urged in the direction of the rotation center axis of the cam member by the urging member and when the valve element is urged through the rotor and the cam member in the closed state, the valve element is pressed against the opening part by torque of the motor and the urging force of the urging member and thus surely closed state of the opening part is obtained.

In the embodiment described above, it is preferable that the cam engagement part of the valve element is engaged with a perpendicular portion of the cam face of the cam member which is formed to be perpendicular to the direction of the rotation center axis in at least one of the open state and the closed state of the opening part by using the valve element. As described above, when the cam engagement part of the valve element is engaged with the perpendicular portion formed perpendicular to the direction of the rotation center axis in the open state or the closed state of the opening part by using the valve element, the cam member is prevented from turning in the opening direction or the closing direction of the valve element due to the urging force by the valve element.

Further, in the embodiment described above, it is preferable that the cam member includes a first cam member (upper cam member) provided with a first cam face which is capable of moving the valve element to the closed state, and a second cam member (lower cam member) provided with a second cam face which is capable of moving the valve element to the open state. The first cam member and the second cam member are rotatable in an integral manner, the first cam face of the first cam member and the second cam face of the second cam member are disposed so as to face each other, and the cam engagement part of the valve element is disposed between the first cam face of the first cam member and the second cam face of the second cam member.

As described above, when the cam engagement part of the valve element is engaged with a cam groove formed between the first or the upper cam member which moves the valve element to the closed state and the second or the lower cam member which moves the valve element to the open state, assembling work of both the cam members and the cam engagement part of the valve element can be performed easily and simply. Further, the respective cam members may be formed in a simple shape which enables easy die molding, and thus manufacturing cost for parts can be reduced.

In the embodiment described above, the first cam face of the first cam member is provided with a pressing face which is perpendicular to the direction of the rotation center axis of the first cam member so as to be engaged with the cam engagement part of the valve element in the closed state of the opening part with the valve element. Further, it is preferable that a rotor of the motor and the first cam member and the second cam member are rotatably supported by a common rotation center axis and they are movable along the rotation center axis, and an urging member is provided for urging the valve element in a direction that the opening part is maintained in the closed state. According to the structure described above, the valve element with which the opening part is set to be in the closed state is urged by the urging member to maintain the closed state through the rotor and the first cam member.

Further, it is preferable that an abutting part of the valve element with the opening part is formed of an elastic body. When the abutting part of the valve element with the opening part is formed of an elastic body, a refrigerant flow path is surely opened and closed even when the abutting face of the fluid opening part with the valve element is rough.

Further, according to an embodiment of the present invention, there is provided a valve element opening/closing device including an inflow part into which fluid is capable of flowing, an outflow part from which the fluid is capable of flowing out, a valve element for opening and closing a flow path for one of the inflow part and the outflow part, an opening part of the flow path which is opened and closed by the valve element, a drive mechanism for operating the valve element to change the opening part to an open state or to a closed state, and a motor which is a drive source for the drive mechanism. In the valve element opening/closing device, the opening part includes a hollow pipe as the inflow part or the outflow part, a plate provided with a mounting hole into which the pipe is inserted, and a valve seat which is provided with a center hole whose diameter is smaller than that of an inner periphery of the pipe, and in which the valve element abuts with the center hole to close the center hole. The valve seat is disposed so as to extend over an end face of the pipe and the plate, and the center hole of the valve seat is disposed within an area of the inner peripheral side of the pipe, and the valve seat is provided with a projecting part which is protruded from an inner circumferential edge of the center hole toward the inner peripheral side of the pipe. Further, a gap space is formed between the plate and the pipe and between the plate and the valve seat so as to be capable of brazing, and brazing material is restricted to flow to an abutting face of the valve seat with the valve element by the projecting part of the valve seat.

According to the valve element opening/closing device in accordance with the embodiment described above, when the pipe is inserted into the mounting hole of the plate and the valve seat is disposed at the inserted end face of the pipe and then they are integrally assembled together by brazing, the brazing material which flows toward the opening part is dammed by the projecting part which is formed in the valve seat so that the projecting part is protruded to the inner peripheral side of the pipe. Therefore, the brazing material does not adhere to the abutting part of the valve seat with the valve element and thus damage of the valve element through repetition of an opening/closing operation of the valve element to the opening part is prevented and the valve element opening/closing device with a long service life can be obtained. Further, according to this embodiment, a problem is prevented in which face roughness of the abutting part of the valve seat with the valve element is increased by the brazing material flowing on the abutting part of the valve seat to deteriorate sealing property between the valve seat and the valve element, which may cause fluid to leak or flow backward in the closed state of the opening part.

In this case, it is preferable that a retaining portion for the brazing material is formed between a whole circumferential outer peripheral face of the projecting part formed at the inner circumferential edge of the valve seat and a whole circumferential inner wall face of the pipe. As described above, when the retaining portion for the brazing material is formed between the projecting part formed at the inner circumferential edge of the valve seat and the inner wall face of the pipe so as to retain excessive brazing material in the retaining portion, flow of the brazing material toward the opening part and thus adhering of the brazing material to the abutting face of the valve seat with the valve element are prevented.

Further, it is preferable that a size of a whole outer periphery of the valve seat is set to be larger than a size of an abutting area of the valve element with the valve seat. In a case that the size of the abutting area of the valve element with the valve seat is set to be smaller than the size of the whole outer periphery of the valve seat, even when some of the brazing material leaks from the outer peripheral edge of the valve seat, the valve element does not contact with the brazing material which is leaked. Therefore, an opening/closing operation of the valve element to the opening part is smoothly performed and damage of the valve element by the leaked and adhered brazing material is prevented.

In addition, it is preferable that the mounting hole for the pipe is formed in a thick portion of the plate. When the pipe mounting hole is formed in a portion having a thickness larger than that of other portion of the plate, joining area of the brazing material between the outer peripheral face of the pipe and the inner wall face of the mounting hole is made larger and thus joining strength of the plate with the pipe by brazing is increased. Further, temporary holding of the pipe to the plate prior to brazing is made easily.

Further, it is preferable that the projecting part of the valve seat is formed by press working. When the projecting part is formed at an inner circumferential edge of the valve seat by press working, the projecting part of the valve seat can be easily formed by burring work. When the projecting part is formed in the valve seat by press working and the wall thickness of the portion around the mounting hole of the plate is formed to be larger, in a case that the brazing material is flown from a space between the inner face of the mounting hole of the plate and the pipe, the joining area of the brazing material between the outer peripheral face of the pipe and the inner wall face of the mounting hole is larger and thus joining strength by brazing of the plate to the pipe can be increased. In addition, the brazing material flowing from the mounting hole of the plate is surely dammed by the projecting part which is formed in the valve seat so as to protrude to the inner peripheral side of the pipe and thus the plate and the pipe, and the plate and the valve seat are surely brazed each other.

Further, it is preferable that the drive mechanism moves the valve element away from the valve seat to cause the opening part to be in an open state and moves the valve element to abut with the valve seat to cause the opening part to be in a closed state, and an abutting part of the valve element with the valve seat is formed of an elastic body. In a case that the drive mechanism is structured so that the valve element and the valve seat repeatedly provide a separated state and an abutting state to change opening and closing states of the fluid opening part, when the abutting part of the valve element with the valve seat is formed of an elastic body, impact of the valve element with the valve seat is relieved and, in addition, the fluid opening part can be surely closed even when thermal deformation of the valve seat is occurred by brazing and flatness of the abutting part of the valve seat with the valve element is not satisfactory.

Further, it is preferable that the valve element is engaged with a slant face formed in a rotational member which is rotationally driven by the drive source, and the valve seat is provided with a valve element regulation part having a turning preventive function which restricts an operation of the valve element so as to move in an axial direction of the rotational member along the slant face of the rotational member when the rotational member is rotated. When the valve seat is provided with the valve element regulation part having a turning preventive function, number of parts and manufacturing cost can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
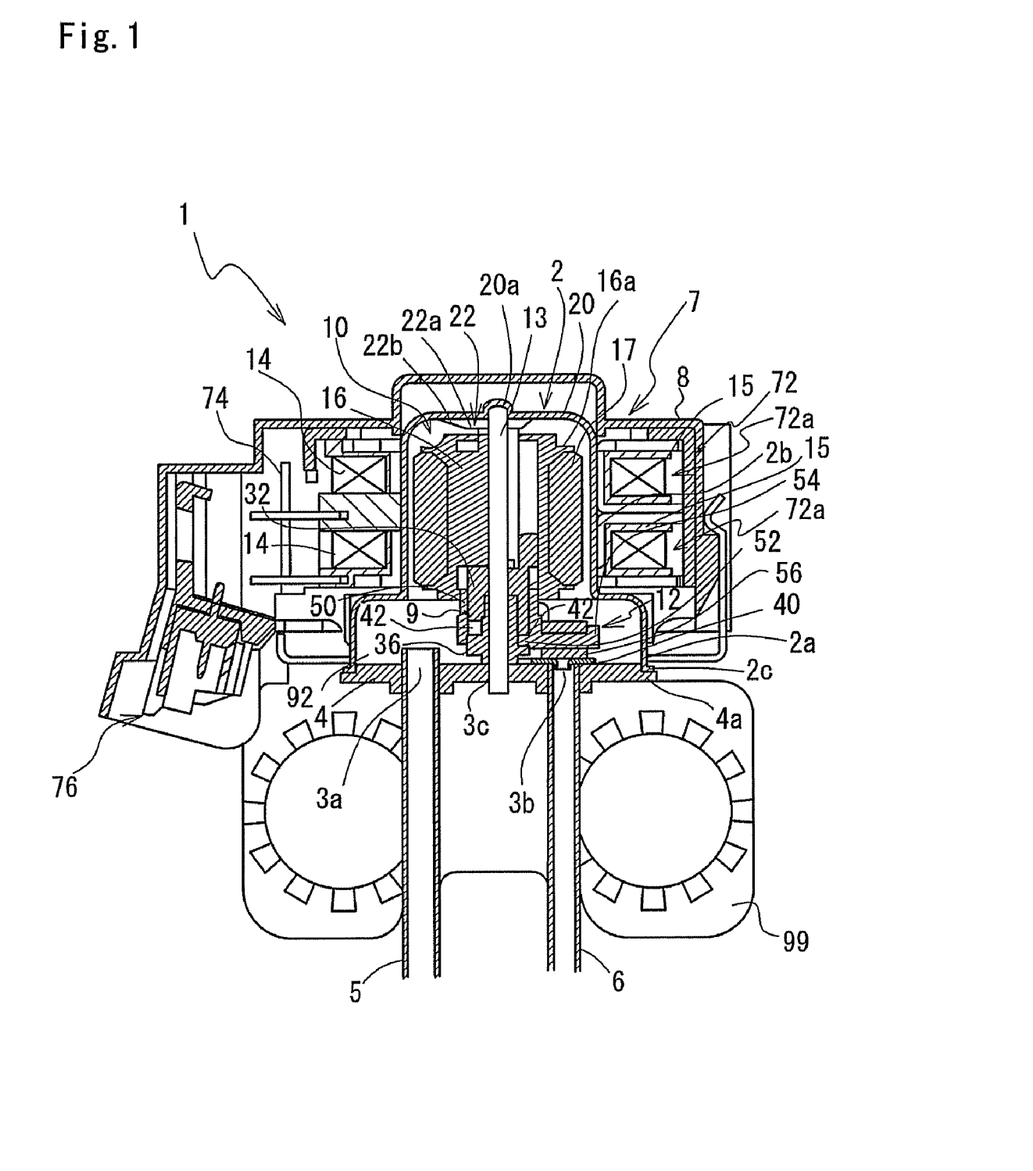
FIG. 1 is a cross-sectional view showing a valve element opening/closing device in accordance with an embodiment of the present invention.
Figure 2:
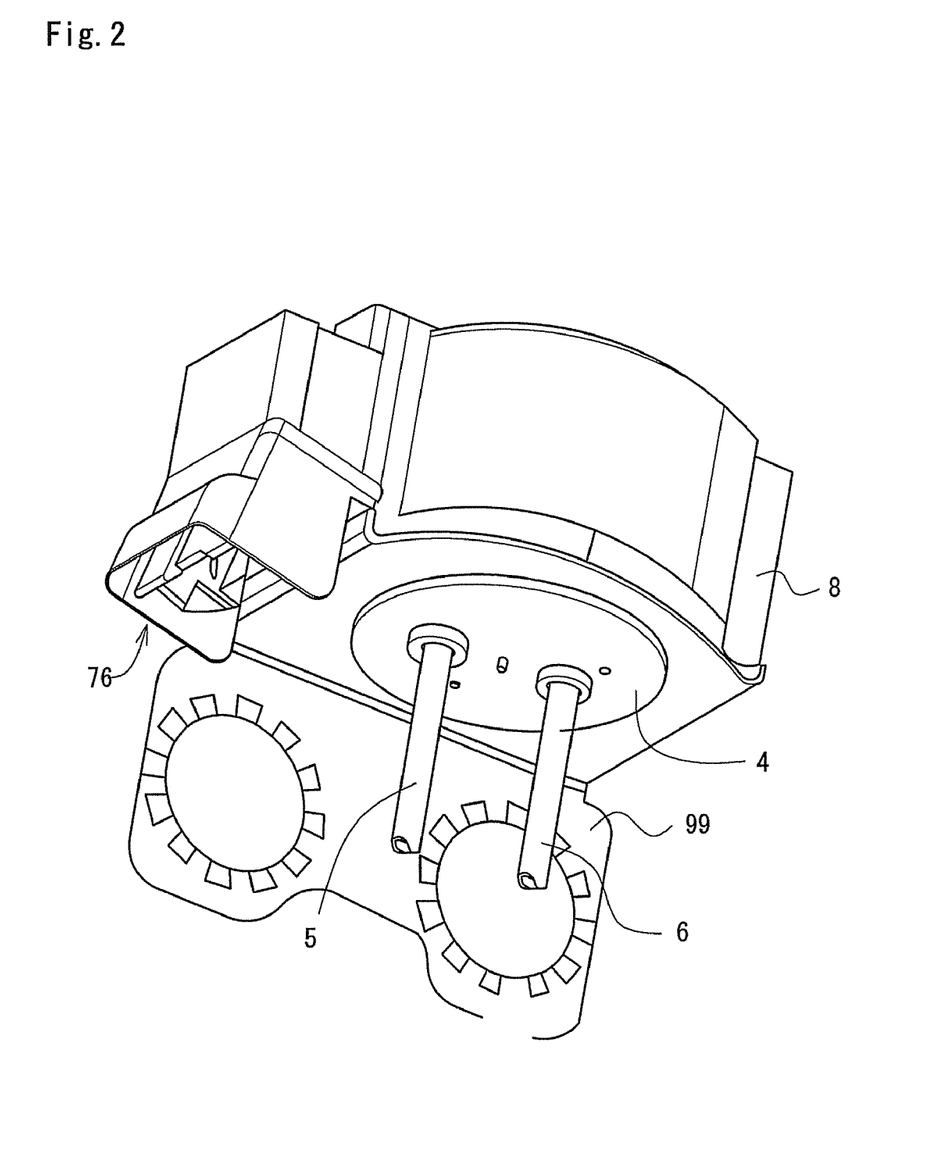
FIG. 2 is a perspective appearance view showing the valve element opening/closing device shown in FIG. 1.

An embodiment of the present invention will be described below in detail with reference to the accompanying drawings. FIG. 1 is a cross-sectional view showing a valve element opening/closing device 1 in accordance with an embodiment of the present invention and FIG. 2 is its perspective appearance view. In the embodiment described below of the present invention, an up-and-down direction means the up-and-down direction in FIG. 1.

As shown in FIGS. 1 and 2, the valve element opening/closing device 1 in accordance with an embodiment of the present invention includes a main body case 2 formed in a bottomed cylindrical shape, a plate 4 which is fixed to the main body case 2, an inflow pipe 5 for allowing fluid through an opening part 3a to flow into fluid cavity 92 which is formed with the plate 4 and the main body case 2, and an outflow pipe 6 for allowing the fluid flowed into the fluid cavity 92 to flow out through an opening part 3b. The inflow pipe 5 and the outflow pipe 6 are respectively fixed to the plate 4.

In the fluid cavity 92 are disposed a valve element 12 for opening and closing at least the opening part 3b of the outflow pipe 6, a drive mechanism part 9 which operates the valve element 12 to change the opening part 3b in an open state or in a closed state, and a rotor 10 of a stepping motor (hereinafter, simply referred to as a motor) 7 which is a drive source of the drive mechanism part 9.

Figure 3:
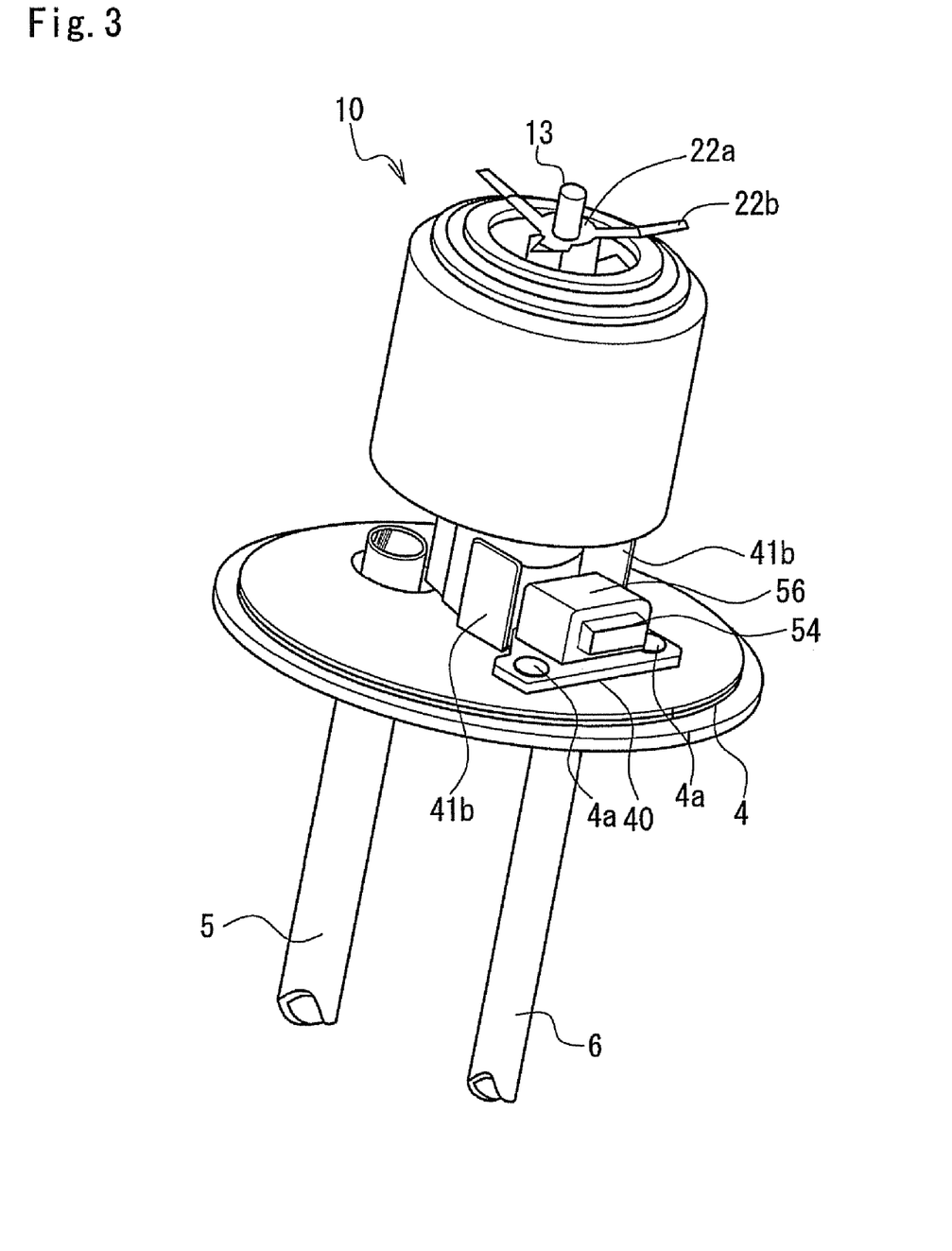
FIG. 3 is a perspective appearance view showing a structure within a main body case of the valve element opening/closing device.
Figure 4:
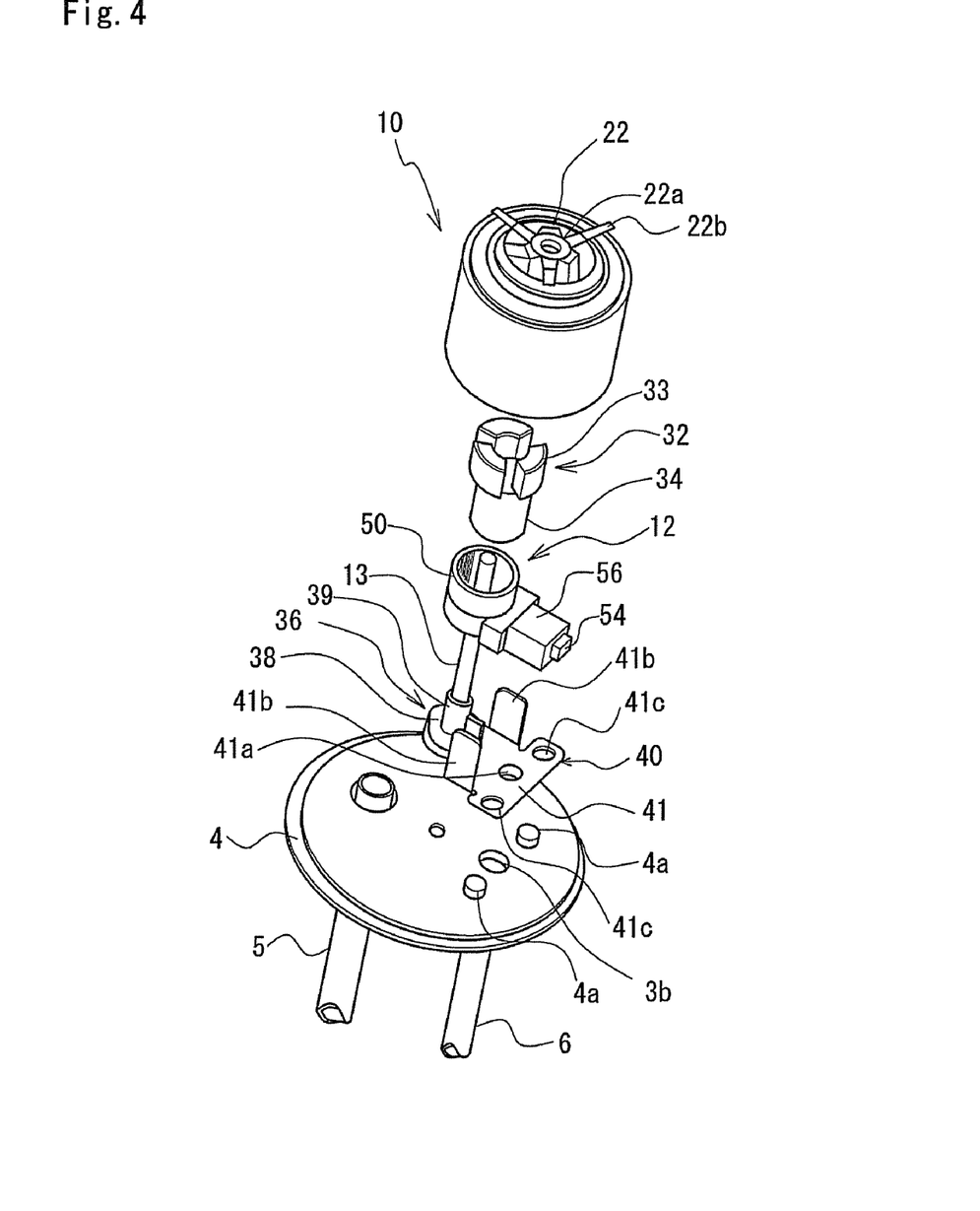
FIG. 4 is an exploded perspective view showing structural components within the main body case shown in FIG. 3.

The respective parts and the mechanism will be described in detail below with reference to FIGS. 1 through 4. FIG. 3 is a perspective appearance view showing a structure within the main body case 2 and FIG. 4 is an exploded perspective view showing the structural components.

The main body case 2 is formed of a relatively large diameter cylindrical part 2a and a relatively small diameter cylindrical part 2b which are integrally formed by press-drawing work by using a metal plate made of stainless steel material. A flange part 2c is formed at an aperture end edge of the large diameter cylindrical part 2a. The flange part 2c and a step portion 4a of the plate 4 are fixed to each other by TIG (Tungsten Inert Gas) welding to form the fluid cavity 92.

One end of a support shaft 13 is fitted into a recessed part 20a which is formed in an inner bottomed wall face 20 of the main body case 2 and the support shaft 13 is supported within the main body case 2. The other end of the support shaft 13 is passed through a center hole 3c of the plate 4 and fixed to the plate 4 by welding.

A rotor 10 of a motor 7 is rotatably supported by the support shaft 13, which is a rotation center axis of the rotor 10, within the small diameter cylindrical part 2b of the main body case 2. In the large diameter cylindrical part 2a, an upper cam member 32 (first cam member) and a lower cam member 36 (second cam member) which structure the driving mechanism part 9 are rotatably supported by the support shaft 13 which is a rotation center axis of the upper cam member 32 and the lower cam member 36.

In addition, the rotor 10 is integrally provided with a ring-shaped magnet (permanent magnet) 17 in a state that the magnet 17 is supported by holding parts 16a which are formed circumferentially at outer peripheral edges of both ends of a shaft cylindrical part 16 which is freely inserted to the support shaft 13.

Further, a stator part 72 is structured so that stators 72a for two phases in which drive coils 14 are wound around coil bobbins 15 are disposed on an outer peripheral face of the small diameter cylindrical part 2b of the main body case 2 so as to face the rotor 10. The stator part 72 is fixed to a stator case 8 so that its outer peripheral face is surrounded by the stator case 8 and mounted on an outer side of the main body case 2.

Respective tip end portions of terminals for the drive coils 14 of the stators 72a are connected to prescribed positions of a control circuit board 74. The control circuit board 74 is electrically connected with an external power source terminal 76.

Therefore, the motor 7 is structured so that magnetic attraction force or magnetic repulsion force is generated in the magnet 17 of the rotor 10 by magnetic field generated by supplying power to the drive coils 14 of the stators 72a. In this manner, the rotor 10 is rotated around the support shaft 13 by the magnetic field.

An urging member 22 for urging the rotor 10 in a direction to the plate 4 is fitted to the support shaft 13 between the inner bottomed wall face 20 of the main body case 2 and the rotor 10. The urging member 22 includes a base plate 22a provided with an insertion hole into which the support shaft 13 is inserted and three flat springs 22b. The tip ends of the flat springs 22a are abutted with the inner bottomed wall face 20 of the main body case 2 and thus the rotor 10 that is freely inserted around the support shaft 13 is always urged to the plate 4 side.

The upper cam member 32 and the lower cam member 36 which are structural components of the driving mechanism part 9 are disposed within the large diameter cylindrical part 2a of the main body case 2. Perspective appearance views of the upper cam member 32 and the lower cam member 36 are shown in FIGS. 5 through 7.

Figure 5:
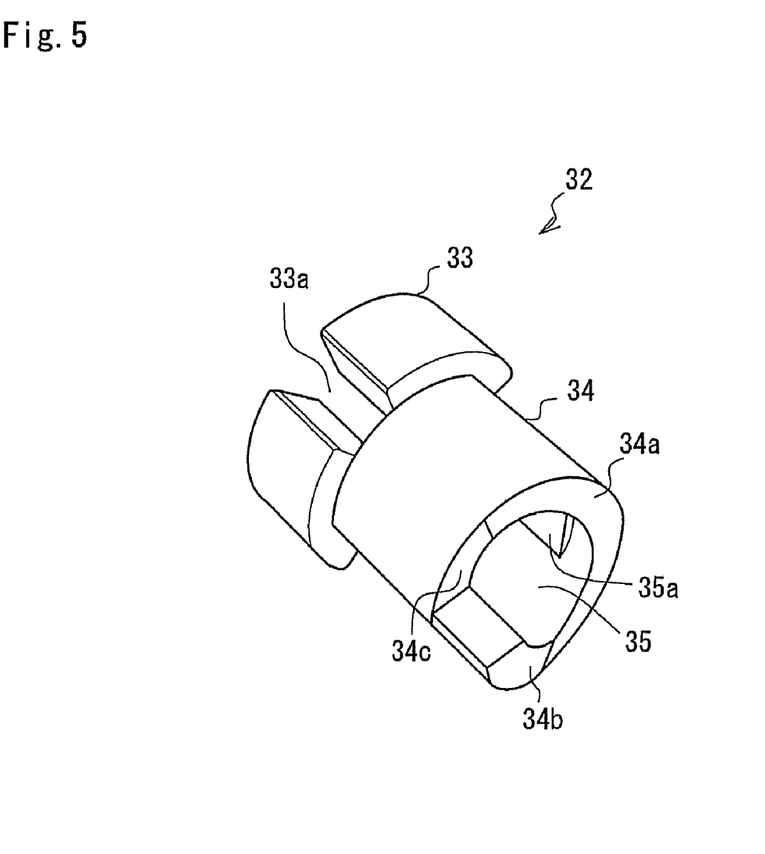
FIG. 5 is a perspective appearance view showing an upper cam member which is one of structural components of a drive mechanism part.
Figure 7:
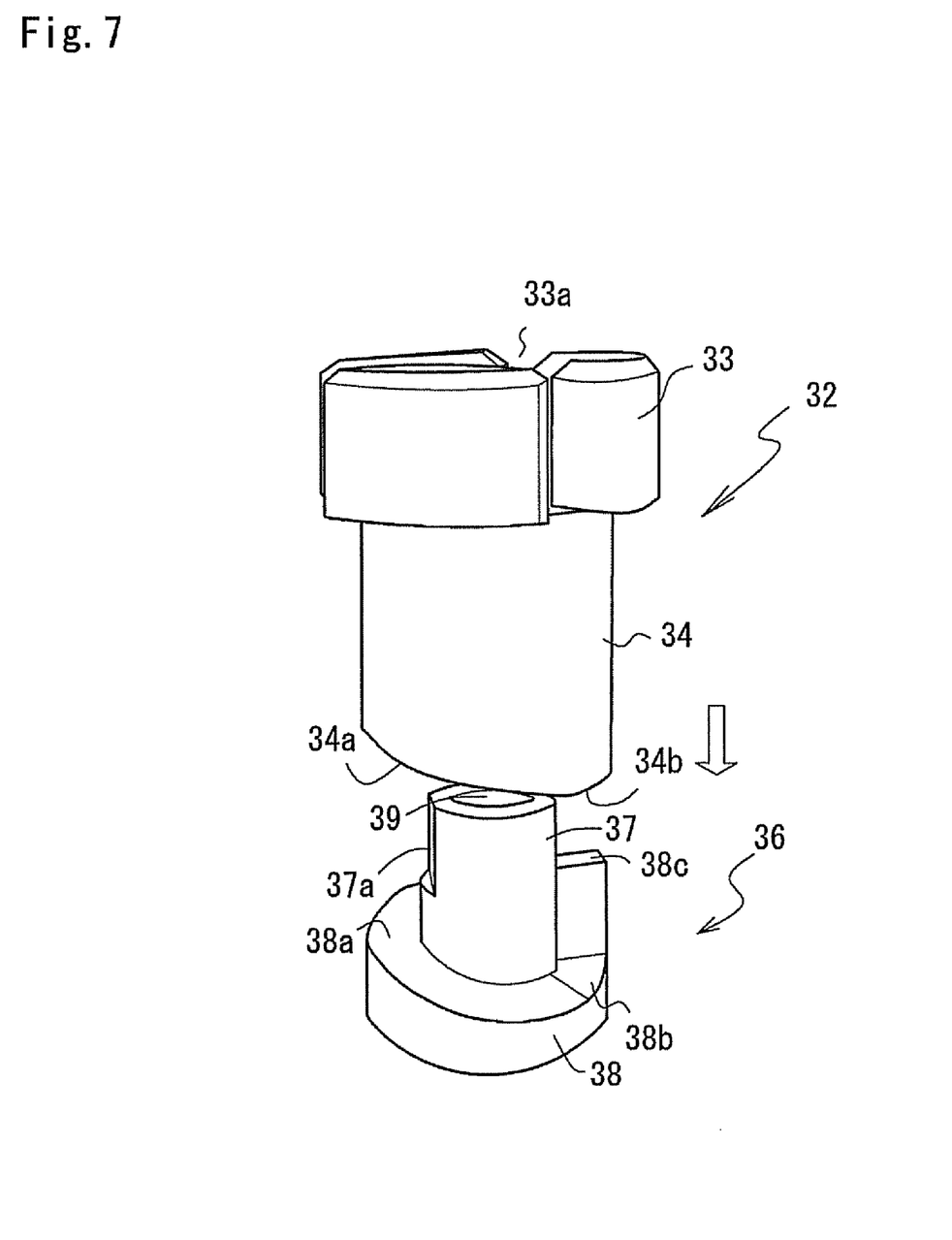
FIG. 7 is a perspective appearance view for explaining an engaging relation between the upper cam member and the lower cam member.

The upper cam member 32 which is shown in detail in FIGS. 5 and 7 is provided with a coupling part 33 having a relatively large diameter, which is formed with three coupling grooves 33a with an equal interval in a circumferential direction. The coupling grooves 33a are respectively engaged with three coupling projecting parts which are formed at a lower end face of the shaft cylindrical part 16 of the rotor 10.

A lower end face of a main body part 34 having a relatively small diameter is formed with an upper cam face 34a (first cam face) formed in a spiral shape, and a pressing face 34b and a bottom face 34c, both of which are formed in a direction perpendicular to the support shaft 13. The main body part 34 is further formed with an engaging hole 35 into which the lower cam member 36 is freely inserted, and a protruded part 35a in a D-cut shape is protruded from the inner wall face of the engaging hole 35.

Figure 6:
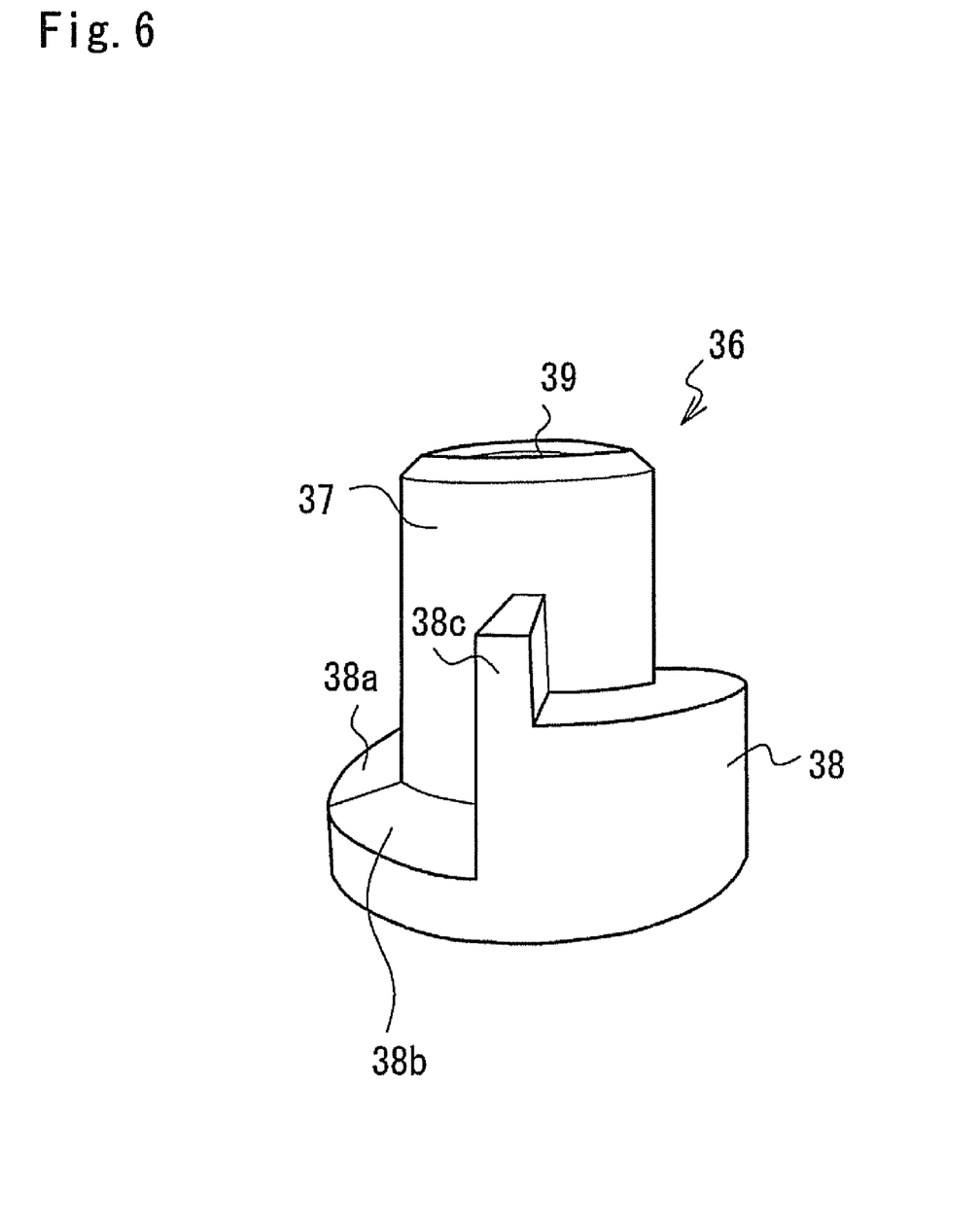
FIG. 6 is a perspective appearance view showing a lower cam member which is one of the structural components of the drive mechanism part.

The lower cam member 36 which is shown in detail in FIGS. 6 and 7 comprises a cylindrical part 37 that is formed to have an outer diameter so as to be capable of freely being inserted into the engaging hole 35, i.e., a through-hole 35 of the upper cam member 32, and a base part 38 which has a larger diameter than the cylindrical part 37. A shaft hole 39 into which the support shaft 13 is freely inserted is formed at a center of the lower cam member 36.

The lower cam member 36 is further provided on a boundary line between the cylindrical part 37 and the base part 38 with a lower cam face 38a (second cam face) which is formed at the same spiral angle as that of the upper cam face 34a, and a receiving stopper face 38b and a height holding projection part 38c, both of which are formed in a direction perpendicular to the support shaft 13. In addition, the cylindrical part 37 is formed with a D-cut recessed part 37a where a part of its outer peripheral face is cut in a flat face.

As shown in FIG. 7, the upper cam member 32 and the lower cam member 36 are engaged with each other so that positions in rotational directions of the D-cut protruded part 35a and the D-cut recessed part 37a are aligned with each other and the cylindrical part 37 of the lower cam member 36 is inserted into the through-hole 35 of the upper cam member 32. Since the D-cut protruded part 35a and the D-cut recessed part 37a are engaged with each other, when the upper cam member 32 is rotationally driven by the rotor 10, the upper cam member 32 and the lower cam member 36 are integrally rotated. Further, in an axial direction, the height holding projection part 38c of the lower cam member 36 is abutted with the bottom face 34c of the upper cam member 32 and thus a position in the axial direction of the upper cam member 32 is determined.

At this time, the upper cam face 34a of the upper cam member 32 and the lower cam face 38a of the lower cam member 36 are positioned so as to have a specified space without contacting with each other. In addition, the pressing face 34b of the upper cam member 32 and the receiving stopper face 38b of the lower cam member 36 are positioned with the same space without contacting with each other. In other words, when the upper cam member 32 and the lower cam member 36 are engaged with each other, as shown in FIG. 1, a cam groove 42 in a substantially spiral shape with a constant width is formed.

Figure 8:
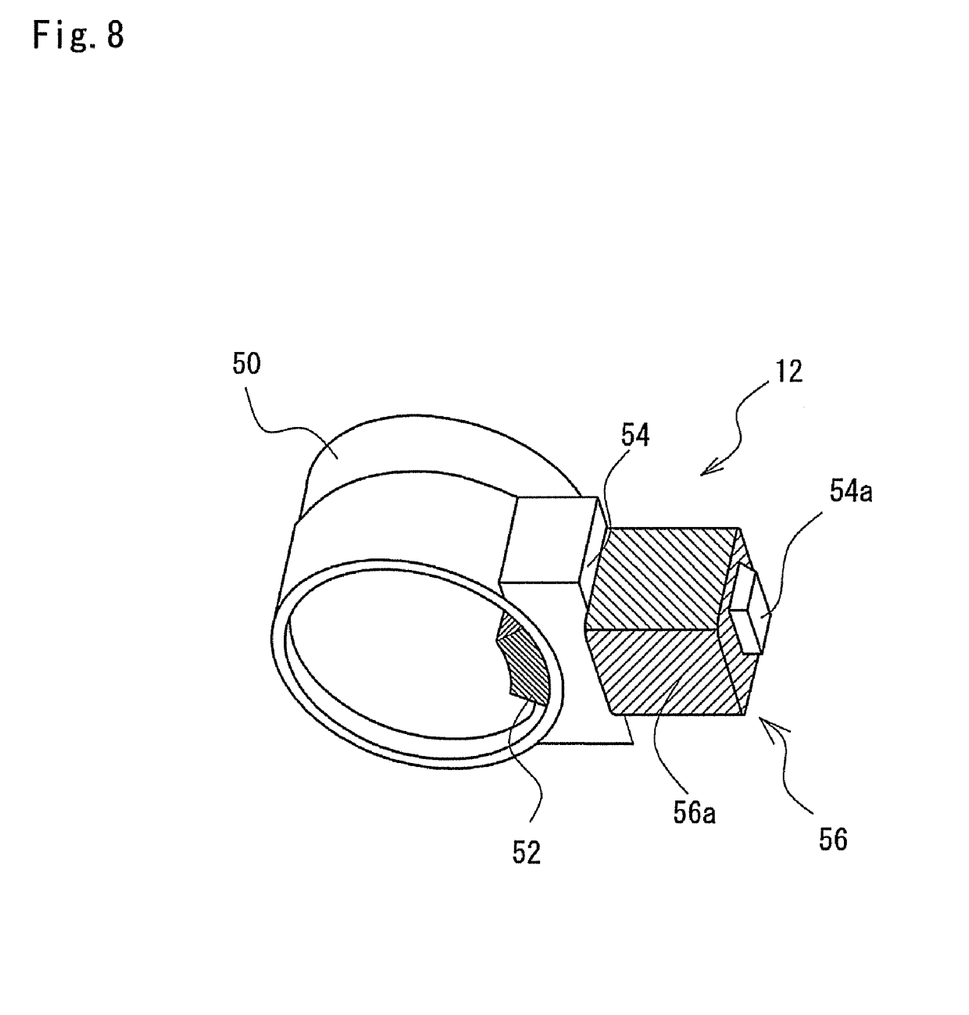
FIG. 8 is a perspective appearance view showing a valve element for opening and closing an opening part which is an outflow port for fluid.
Figure 9:
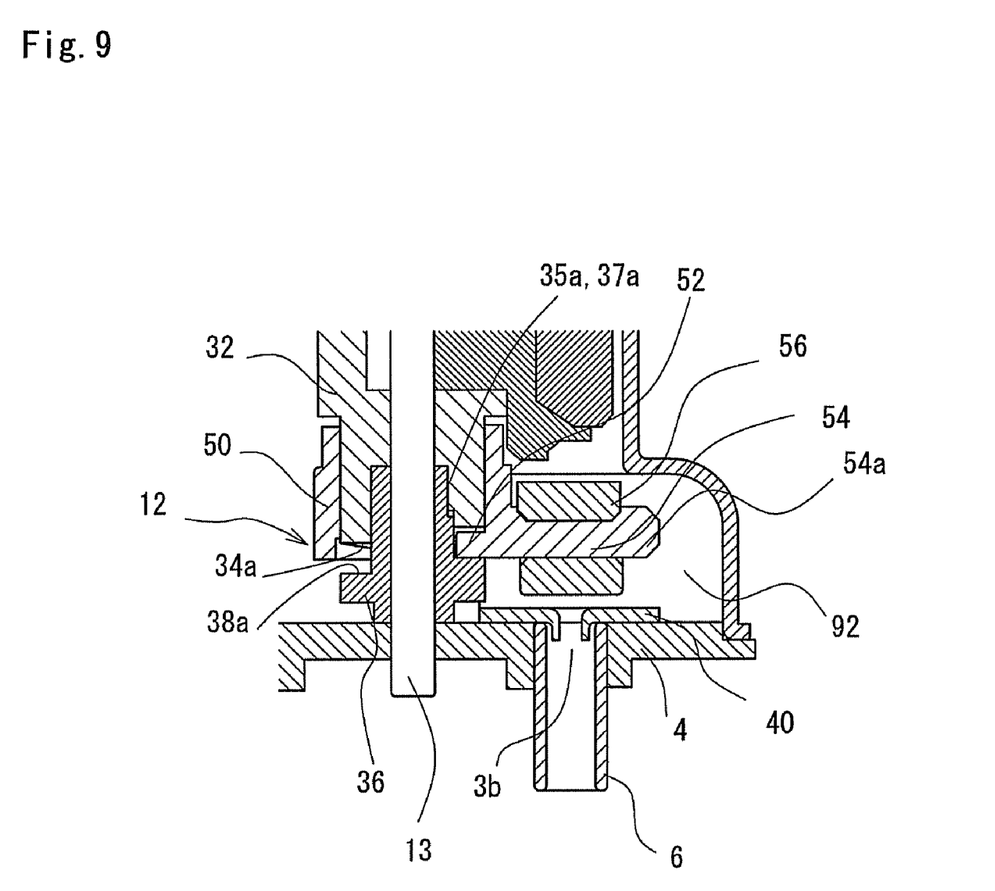
FIG. 9 is a cross-sectional view showing a state where an opening part which is an outflow port for fluid is opened.

Next, a structure and operation of a valve element 12 which is engaged with the upper cam member 32 and the lower cam member 36 will be described below. FIG. 8 is a perspective appearance view of the valve element 12 and FIG. 9 is a sectional view showing an open state of the opening part 3b.

As shown in FIG. 8, the valve element 12 which is engaged with the upper cam member 32 and the lower cam member 36 is provided with a cam engagement part 52, which is protruded from an inner wall of a slider part 50 which is a cylindrical-shaped member, and into which the main body part 34 of the upper cam member 32 is capable of being freely inserted. The cam engagement part 52 is engaged with the cam groove 42 which is formed by the upper cam member 32 and the lower cam member 36. A width of the cam engagement part 52 in a direction of the support shaft 13 is set to be smaller than that of the cam groove 42 and thus a small clearance is provided when the cam engagement part 52 is engaged with the cam groove 42.

A pad holding part 54 which is a block shaped member having a step portion is protruded from an outer wall face of the slider part 50. A pad 56 for closing the opening part 3b shown in FIG. 9 is made of urethane rubber which is an elastic body. The pad holding part 54 is inserted into a mounting hole of the pad 56 to structure the valve element 12. In accordance with an embodiment, a slip-off preventing part 54a is provided at a tip end of the pad holding part 54 and thus the pad 56 does not slip off accidentally. A pad abutting part 56a of the pad 56 is pressed against a valve seat 40 to close the opening part 3b which is a fluid outflow port.

The valve seat 40 shown in FIG. 4 is a plate member which is integrally manufactured by press working. A burring hole part 41a which is fitted into the opening part 3b to form a fluid outflow passage is formed at a roughly center portion of a base 41 of the valve seat 40. Further, turning preventing parts 41b which prevent turning of the valve element 12 in a rotational direction are formed so as to be bent up from the base 41 perpendicularly.

Positioning holes 41c are formed in the base 41 near the turning preventing parts 41b and the positioning holes 41c are fitted to two positioning projections 4a formed in the plate 4 so that the valve seat 40 is positioned and fixed to the plate 4.

As shown in FIG. 4, in the driving mechanism part 9 structured as described above, the rotor 10, the upper cam member 32 and the lower cam member 36 are rotatably supported by the support shaft 13 from an upper side in this order, and the valve element 12 is engaged between the upper cam member and the lower cam member.

In other words, the upper cam member 32 is freely fitted to the support shaft 13 under a state that the coupling part 33 is located on an upper side and the upper cam member 32 is engaged with the shaft cylindrical part 16 of the rotor 10 through the coupling part 33. After the main body part 34 of the upper cam member 32 is freely inserted into the slider part 50 of the valve element 12, the lower cam member 36 is freely fitted to the support shaft 13 and engaged with the upper cam member 32 in a state that the base part 38 is located on a lower side. In this manner, the cam engagement part 52 of the valve element 12 is engaged with the cam groove 42 which is formed by the upper cam member 32 and the lower cam member 36.

The pad holding part 54 and the pad 56 of the valve element 12 which is engaged with the cam groove 42 as described above are assembled so as to be located between two turning preventing parts 41b of the valve seat 40 which is fixed to the plate 4.

In the valve element opening/closing device 1 structured as described above, in a closed case where the pad 56 of the valve element 12 is abutted with the opening part 3b and a flow path is closed (the state shown in FIG. 1), when the rotor 10 is rotated in a counterclockwise direction in view from the side of the motor 7, the upper cam member 32 and the lower cam member 36 are operated and rotated together with the rotor 10. Therefore, the valve element 12 which engages with the cam groove 42 through the engagement part 52 receives a force which causes the valve element 12 to move in an upward direction along the spiral cam face 38a of the lower cam member 36.

In this case, the pad holding part 54 of the valve element 12 is disposed between the turning preventing parts 41b of the valve seat 40, and thus an operation of the valve element 12 in a circumferential direction is restricted. Therefore, as shown in FIG. 9, the valve element 12 moves upward in parallel with the support shaft 13 which is the rotation center axis of the upper cam member 32 and the lower cam member 36, and the valve element 12 moves away from the opening part 3b to open the opening part 3b which is a fluid outflow port.

On the other hand, in order to change the opening part 3b from the open state to a closed state, the rotor 10 is reversely rotated to cause the upper cam member 32 and the lower cam member 36 to rotate together with the rotor 10 in the reverse direction. As a result, the valve element 12 which is engaged with the cam groove 42 through the cam engagement part 52 receives a force which causes the valve element 12 to move in a downward direction along the spiral cam face 34a of the upper cam member 32.

Since an operation of the valve element 12 in a rotating direction is restricted by the turning preventing parts 41b of the valve seat 40, the valve element 12 moves in a lower direction in parallel with the support shaft 13 to close the opening part 3b and thus the pad 56 is pressed against the valve seat 40 and the opening part 3b is closed.

In other words, in this valve element opening/closing device 1, the valve element 12 performs up and down movement to the opening part 3b in parallel with the support shaft 13 by a moving amount in an axial direction defined by the cam groove 42 according to rotation of the upper cam member 32 and the lower cam member 36. Therefore, the pad 56 repeats linearly moved opening/closing operation of the valve element where the opening part 3b which is the fluid-tight outflow port is opened or closed.

As described above, in the valve element opening/closing device 1 in accordance with an embodiment of the present invention, the valve element 12 engaged between the upper cam face 34a of the upper cam member 32 formed in a spiral shape and the lower cam face 38a of the lower cam member 36 formed in a spiral shape receives a force to move along the spiral shapes of the upper cam face 34a and the lower cam face 38a with the motor 7 as a drive source. However, an operation of the valve element 12 in the rotating direction is restricted by the turning preventing parts 41b of the valve seat 40 and thus the valve element 12 moves in parallel with the support shaft 13.

Accordingly, in accordance with the embodiment of the present invention, a sliding operation is not performed between the valve element 12 and the valve seat 40 and thus starting performance of the valve element 12 is not decreased by sliding friction and abrasion of the valve element is prevented. Further, the upper cam member 32 and the lower cam member 36 are capable of being manufactured by integral molding with a molding die and thus they are superior in mass-productivity. The spiral shape of the cam faces 34a and 38a can be set freely and thus opening/closing of the flow path can be surely performed with a small motor torque by setting the spiral angle to be small.

In accordance with this embodiment, spiral length of the upper cam face 34a of the upper cam member 32 and spiral length of the lower cam face 38a of the lower cam member 36 are set to be in a range of 360 degrees or less, and thus rotation quantity of the rotor 10 is restricted less than one turn (one rotation) to perform opening/closing operation of the valve element 12.

In other words, opening/closing operation of the flow path can be performed with reduced rotation quantity of the motor and thus energy efficiency is superior and, in addition, response performance of opening/closing operation of the valve element 12 at the opening part 3b is improved.

In addition, as described above, an urging member 22 is disposed between the rotor 10 and the inner bottomed wall face 20 of the main body case 2 to urge the rotor 10 in a direction to the plate 4 side. The valve element 12 is always urged toward the plate 4 by the urging force through the upper cam member 32 and the lower cam member 36. In order to utilize the urging force of the urging member 22, it is preferable that, when the opening part 3b is changed from an open state to a closed state, the valve element 12 abuts with the valve seat 40 at a halfway position of the cam groove 42.

In other words, after the valve element 12 is abutted with the valve seat 40, the rotor 10 is further rotated. However, since the valve element 12 is abutted with the valve seat 40, the valve element 12 is not moved downward further and thus the upper cam member 32 and the rotor 10 are relatively moved upward against the urging force of the urging member 22 and the valve element 12 is depressed by a stronger urging force of the urging member 22. Therefore, the valve element 12 is pressed to the valve seat 40 with a torque of the motor 7 and the urging force of the urging member 22 and thus the opening part 3b is brought into a surely closed state.

Further, in this embodiment, the cam member which receives rotational movement of the rotor 10 to drive the valve element 12 is divided into two members which are the upper cam member 32 and the lower cam member 36. According to this structure, assembling work of the cam engagement part 52 of the valve element 12 to the cam groove 42 formed in the cam member is easier in comparison with a case that the cam member is structured of one piece of member. Further, the upper and the lower cam members may be respectively formed in simple shapes so as to be capable of easily molding with molding dies.

In order to prevent leakage of fluid and surely close a flow path when the opening part 3b is in the closed state, the opening part 3b is required to be pressed with a stronger force. As a comparison, for example, it is assumed that the cam engagement part 52 is pressed down by the cam face 34a, i.e., by an inclined face of the upper cam member 32, and that power supply to the motor 7 is stopped under a state that the pad 56 is depressed against the opening part 3b and the closed state of the opening part 3b is maintained by a detent torque of the motor 7. In this case, when an inclination of the cam face 34a is formed at an angle of more than the friction angle with the cam engagement part 52, sliding occurs between the cam face 34a and the cam engagement part 52 and, as a result, the upper cam member 32 and the lower cam member 36 are rotated against the detent torque of the motor 7 and thus the closed state of the valve is not maintained.

However, in the embodiment of the present invention, it is structured that, in the closed state of the opening part 3b, the pressing face 34b which is formed to be perpendicular to the direction of the rotation center axis of the upper cam member 32 presses the cam engagement part 52 in the direction of the support shaft 13. Therefore, even when the valve element 12 receives fluid pressure to cause the valve element 12 to move in the open direction, the cam member does not rotate or turn in the open direction and thus the valve element 12 is surely locked at the position in the closed state with a small detent torque.

In addition, since the pad 56 is an elastic body formed of urethane rubber, the pad 56 is elastically deformed to tightly contact with the opening part 3b and thus fluid leakage in the opening part 3b can be prevented surely.

Therefore, polishing of the valve element and its abutting part for reducing roughness of their faces is not required and, even when the face roughness of the valve seat 40 against which the pad 56 is pressed is large, the fluid passage is closed surely.

Figure 10A:
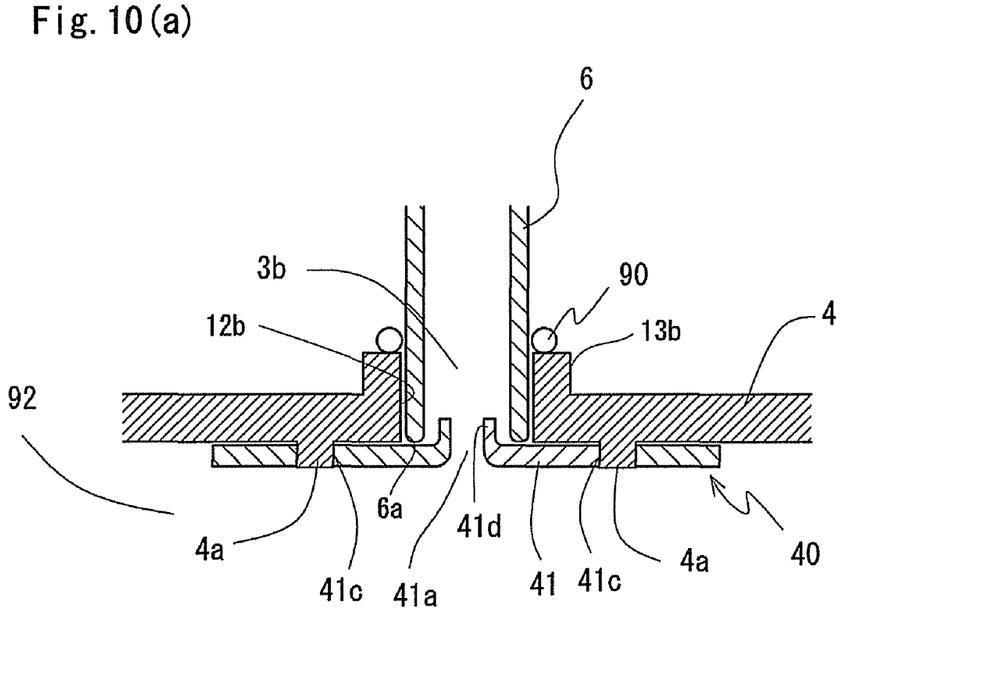
FIGS. 10(a) and 10(b) are cross-sectional views showing flow of brazing material when an outflow pipe and a valve seat are fixed to a plate by brazing.
Figure 10B:
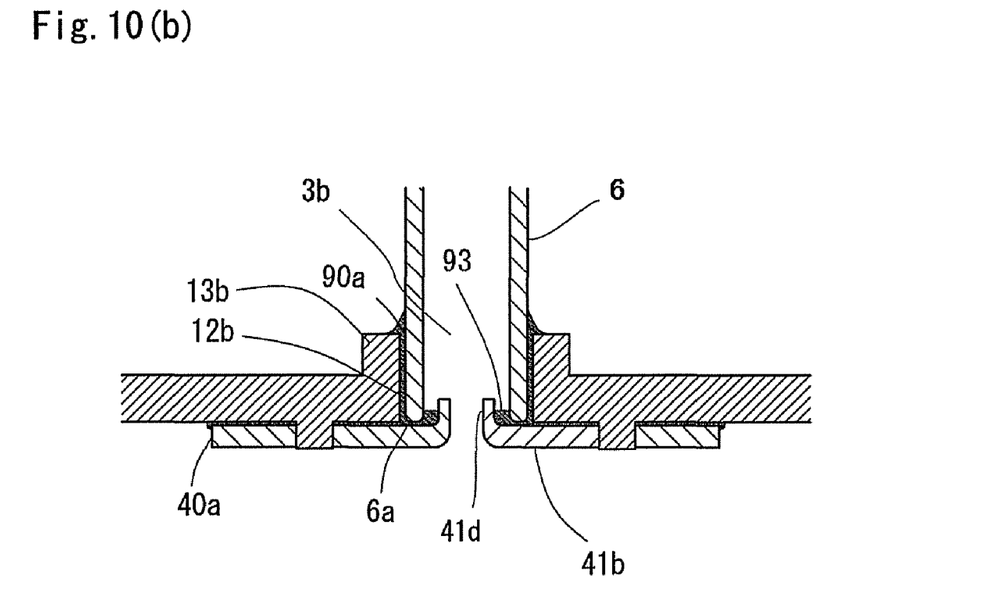

As described above, the valve seat 40, which performs a turning preventive function for the valve element 12 and is provided with an abutting face for the valve element 12 in the closed state of the opening part 3b, is fixed to the plate 4 together with the outflow pipe 6 by nickel brazing (hereinafter, simply referred to as "brazing"). FIGS. 10(a) and 10(b) are cross-sectional views showing the opening part 3b which is an outflow port of fluid formed in the plate 4. Since the brazing work is performed in a state that the valve seat 40 is placed on an under face side of the plate 4, FIGS. 10(a) and 10(b) are shown upside down with respect to FIG. 1 and the like.

As shown in FIG. 10(a), the outflow pipe 6 is freely inserted into a mounting hole 12b so that its tip end part 6a is aligned with a face on the fluid cavity 92 side of the plate 4. The valve seat 40 is integrally formed by press working and positioning holes 41c are formed in a base 41 of the valve seat 40. Two positioning protruded parts 4a formed in the plate 4 are fitted to the positioning holes 41c, and a circular projecting part 41d at the burring hole 41a is entered into an inner peripheral side of the outflow pipe 6 and positioned by the positioning protruded parts 4a.

In this state, the outflow pipe 6 and the valve seat 40 are temporarily fixed to a brazing jig while a gap space for brazing is maintained between the plate 4 and the outflow pipe 6 and between the plate 4 and the valve seat 40 and then flux is coated to infiltrate between abutting faces of the plate 4 and the outflow pipe 6 and of the plate 4 and the valve seat 40. After that, a ring-shaped nickel brazing material (hereinafter, simply referred to as "brazing material") 90 is provided from a tip end side of the outflow pipe 6 and placed at a boundary between the outflow pipe 6 and the plate 4, and then the brazing material 90 is heated in a heating furnace.

As shown in FIG. 10(b), the brazing material 90a which has been melted in the above-mentioned heating step flows into the gap space between the outer peripheral face of the outflow pipe 6 and the mounting hole 12b. When the brazing material 90a flows to a position where the valve seat 40 is disposed, the brazing material 90a is branched into the gap space between the valve seat 40 and the plate 4 and into the gap space between the valve seat 40 and the tip end part 6a of the outflow pipe 6. The brazing material 90a flowing into the gap space between the valve seat 40 and the plate 4 flows to an outer peripheral edge 40a of the valve seat 40 through capillary phenomenon and the valve seat 40 is fixed to the plate 4.

The brazing material 90a which flows between the valve seat 40 and the tip end part 6a of the outflow pipe 6 flows toward the opening part 3b. However, flow of the brazing material 90a is dammed by the projecting part 41d around the burring hole 41a and thus the brazing material 90a does not flow out through the opening part 3b to prevent from adhering to the front face 41b of the valve seat 40.

Further, in this embodiment, a retaining portion 93 in which a certain amount of the brazing material 90a is capable of being stored is formed between an inner wall face of the outflow pipe 6 and the projecting part 41d. Therefore, the brazing material 90a is prevented from going up between the projecting part 41d and the inner wall face of the outflow pipe 6 through capillary phenomenon to flow out from the opening part 3b to the front face 41b of the valve seat 40. In addition, since a certain amount of the brazing material 90a is stored in the retaining portion 93, the brazing material 90a is prevented from flowing toward the opening part 3b.

As shown in FIG. 1, FIG. 9 and the like, the abutting part 56a of the pad 56 which is mounted on the valve element 12 is formed in a smaller size than the peripheral size of the valve seat 40. This is because that the brazing material 90a which is stored in the retaining portion 93 and restricted to flow toward the opening part 3b is forcibly flowed toward an outer peripheral edge 40a side of the valve seat 40. As a result, there is a possibility that the brazing material 90a flows out from the outer peripheral edge 40a and adheres its vicinity, and thus an edge of the brazing material may cause to damage the abutting part 56a of the pad 56. However, according to the embodiment of the present invention, since the abutting part 56a of the pad 56 is formed in a smaller size than the valve seat 40, damage to the pad 56 of the valve element 12 by the edge of the adhered brazing material is prevented.

Further, as shown in FIGS. 10(a) and 10(b), the mounting hole 12b is formed in a thick wall part 13b of the plate 4 having a large thickness. Therefore, contact area of an outer peripheral face of the outflow pipe 6 with an inner wall face of the mounting hole 12b is large. Accordingly, temporary fixing of the outflow pipe 6 to the plate 4 before brazing is easy and brazing strength of the plate 4 with the outflow pipe 6 is increased.

As described above, according to the valve element opening/closing device 1 in accordance with this embodiment, when the outflow pipe 6 and the valve seat 40 disposed at a position of the inserted end face of the outflow pipe 6 are brazed with the mounting hole 12b of the plate 4, the projecting part 41d which is formed in the valve seat 40 is inserted into the inner peripheral side of the outflow pipe 6 and thus the brazing material 90a flowing toward the opening part 3b is dammed by the projecting part 41d of the valve seat 40. Therefore, the brazing material 90a is prevented from flowing out on the front face or the abutting face of the valve seat 40 with the valve element 12. Accordingly, problems are prevented in which face roughness of the abutting part becomes large to cause to be unable of closing the flow path and the valve element 12 is damaged by an edge of the brazing material 90a which is adhered on the front face or the abutting face of the valve seat 40.

Further, the retaining portion 93 in which a certain amount of the brazing material 90a is capable of being stored is formed between the projecting part 41d formed in the valve seat 40 and the inner wall face of the outflow pipe 6. Therefore, the brazing material 90a is prevented from flowing out from the projecting part 41d of the valve seat 40 and thus the brazing material 90a does not adhere near the opening part 3b and the pad 56 of the valve element 12 abutting with the valve seat 40 is not damaged by the brazing material 90a.

In addition, in this embodiment, the abutting part 56a of the pad 56 which is mounted on the valve element 12 is formed in a smaller size than the valve seat 40. Therefore, even when the brazing material is adhered near the outer peripheral edge part 40a of the valve seat 40, the pad 56 of the valve element 12 is not damaged.

Further, the mounting hole 12b to which the outflow pipe 6 is fixed with brazing is formed in the thick wall part 13b of the plate 4. Therefore, contact area of the outer peripheral face of the outflow pipe 6 with the inner wall face of the mounting hole 12b is large and thus temporary fixing of the outflow pipe 6 to the plate 4 before brazing is easily performed and brazing strength of the plate 4 with the outflow pipe 6 can be increased.

Further, the valve seat 40 is formed in a simple shape and capable of being integrally formed by press working and thus its manufacturing cost can be reduced and the projecting part 41d of the valve seat 40 for preventing flowing out of the brazing material can be easily formed by burring working. In addition, in a case of the prior art where a valve element and a valve seat are face-contacted and slid with each other, when the valve seat 40 is formed by press working, the valve seat 40 is required to provide a high degree of smoothness by polishing. However, the embodiment of the present invention provides a linearly moving valve element structure in which the valve element 12 is linearly moved to the opening part 3b which is the fluid outflow port and the pad 56 is made of urethane rubber which is an elastic body. Therefore, the opening part 3b can be surely closed even when the valve seat 40 is not polished or the like.

Further, in the embodiment described above, the valve seat 40 which abuts with the pad 56 of the valve element 12 is provided with the turning preventing parts 41b and thus the valve seat is also provided with a turning preventing function. Therefore, manufacturing cost of the valve element opening/closing device 1 can be reduced.

The present invention has been described in detail using the embodiments, but the present invention is not limited to the embodiments described above and many modifications can be made without departing from the present invention.

For example, the valve element opening/closing device 1 in accordance with an embodiment of the present invention is preferably applicable to a case when the valve element opening/closing device 1 is mounted on an inside of a refrigerator or the like through a mounting plate 99 to control opening and closing a flow path of refrigerant such as isobutane or chlorofluorocarbon (CFC). However, the present invention may be applicable to an open/close valve for controlling opening and closing of other liquid or gas.

Further, in the embodiment described above, the pad 56 provided in the valve element 12 is made of urethane rubber. However, the present invention is not limited to this embodiment and any material which is elastic and capable of surely closing the opening part 3b may be used.

Further, in the brazing step of the outflow pipe 6 and the valve seat 40 to the plate 4, the ring-shaped brazing material 90 is placed at a boundary portion between the outflow pipe 6 and the plate 4, and then the brazing material 90 is heated and melted in a heating furnace. However, in the present invention, brazing may be performed by handwork.

Further, in the brazing step described above, the brazing material 90a is flowed from the boundary portion between the plate 4 and the outflow pipe 6. However, even when the brazing material 90a is flown from the outer peripheral edge part 40a of the valve seat 40, leakage of the brazing material 90a flowing toward the opening part 3b is prevented by the projecting part 41d and thus similar effects to the embodiment described above are obtained.

Further, the valve element 12 for opening and closing a flow path is provided only to the opening part 3b which is an outflow port. However, the valve element 12 may be disposed to the fluid inflow port and alternatively, the valve element 12 may be disposed both to the outflow port and the inflow port. Further, the present invention may be applied to a valve element opening/closing device having a plurality of outflow ports and inflow ports.

In addition, in the embodiment described above, the valve element 12 for opening or closing a flow path is arranged only at the opening part 3b which is a fluid outflow port, and the outflow pipe 6 and the valve seat 40 are brazed with the plate 4. However, the present invention may be applied to a valve element opening/closing device in which fluid inflow port is opened and closed, or in which both an inflow port and an outflow port are controlled to open and close.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve element opening/closing device for use with a fluid comprising:
    an inflow part into which the fluid is capable of flowing;
    an outflow part from which the fluid is capable of flowing out;
    opening parts which are provided in the inflow part and the outflow part;
    a valve element for opening and closing at least one of the opening parts;
    a drive mechanism for operating the valve element to change the opening part to an open state and to a closed state;
    a motor which is a drive source for the drive mechanism; and
    an urging member for urging the valve element in a direction such that the opening part is maintained in the closed state;
    wherein the drive mechanism comprises:
        a cam engagement part which is formed in the valve element;
        a cam member which is rotationally driven by the motor;
        a cam face which is formed in the cam member so as to be inclined with respect to a direction of a rotation center axis of the cam member and engaged with the cam engagement part; and
        a turning preventing part which restricts turning of the valve element due to rotational drive of the cam member to move the valve element linearly;
        wherein the valve element is linearly moved in parallel with the rotation center axis of the cam member through the cam engagement part of the valve element which receives a moving force along the cam face formed in the cam member together with rotation of the cam member; and
    wherein a rotor of the motor is movably held in the direction of the rotation center axis of the cam member and the valve element is urged by the urging member to close the opening part through the rotor and the cam member when the opening part is in the closed state.

2. The valve element opening/closing device according to claim 1, wherein the valve element is a valve element for opening and closing an opening part formed in the outflow part.

3. The valve element opening/closing device according to claim 1, wherein the cam engagement part of the valve element is engaged with a perpendicular portion of the cam face of the cam member which is formed perpendicular to the direction of the rotation center axis in at least one of the open state and the closed state of the opening part by the valve element.

4. The valve element opening/closing device according to claim 1, wherein an abutting part of the valve element with the opening part is formed of an elastic body.

5. The valve element opening/closing device according to claim 1, wherein the cam member comprises:
    a first cam member provided with a first cam face which is capable of moving the valve element to the closed state; and
    a second cam member provided with a second cam face which is capable of moving the valve element to the open state;
    wherein the first cam member and the second cam member are rotatable in an integral manner;
    the first cam face of the first cam member and the second cam face of the second cam member are disposed so as to face each other; and
    the cam engagement part of the valve element is disposed between the first cam face of the first cam member and the second cam face of the second cam member.

6. The valve element opening/closing device according to claim 5, wherein the first cam face of the first cam member is provided with a pressing face which is perpendicular to the direction of the rotation center axis of the first cam member so as to engage with the cam engagement part of the valve element in the closed state of the opening part by the valve element.

7. The valve element opening/closing device according to claim 6,
    wherein a rotor of the motor and the first cam member and the second cam member are rotatably and commonly held at a rotation center axis and are movable along the rotation center axis, and
    the valve element with which the opening part is set to be in the closed state is urged by the urging member to maintain the closed state through the rotor and the first cam member.

8. The valve element opening/closing device according to claim 5, wherein an abutting part of the valve element with the opening part is formed of an elastic body.

9. A valve element opening/closing device for use with a fluid comprising:
    an inflow part into which the fluid is capable of flowing;
    an outflow part from which the fluid is capable of flowing out;
    a valve element for opening and closing a flow path of one of the inflow part and the outflow part;
    an opening part of the flow path which is opened and closed by the valve element;
    a drive mechanism for operating the valve element to change the opening part to an open state and to a closed state; and
    a motor which is a drive source for the drive mechanism;
    wherein the opening part comprises:
        a hollow pipe as the inflow part or the outflow part;
        a plate provided with a mounting hole into which the pipe is inserted; and
        a valve seat which is provided with a center hole whose diameter is smaller than that of an inner periphery of the pipe, and in which the valve element abuts with the center hole to close the center hole;
    wherein the valve seat is disposed so as to extend over an end face of the pipe and the plate, and the center hole of the valve seat is disposed within an area of the inner periphery of the pipe, and the valve seat is provided with a projecting part which is protruded from an inner circumferential edge of the center hole to an inner peripheral side of the pipe, and a gap space is formed between the plate and the pipe and between the plate and the valve seat so as to be brazed with brazing material, and the brazing material is restricted to flow out to an abutting face of the valve seat with the valve element by the projecting part of the valve seat.

10. The valve element opening/closing device according to claim 9, wherein a retaining portion for the brazing material is formed between a whole outer peripheral face of the projecting part formed at the inner circumferential edge of the valve seat and a whole inner wall face of the pipe.

11. The valve element opening/closing device according to claim 9, wherein a size of a whole outer periphery of the valve seat is set to be larger that a size of an abutting area of the valve element with the valve seat.

12. The valve element opening/closing device according to claim 9, wherein the mounting hole is formed in a thicker portion of the plate.

13. The valve element opening/closing device according to claim 9, wherein the projecting part of the valve seat is formed by press working.

14. The valve element opening/closing device according to claim 13, wherein the mounting hole is formed in a thicker portion of the plate.

15. The valve element opening/closing device according to claim 14, wherein the plate and the pipe are brazed and the plate and the valve seat are brazed by brazing material flowing from a space between the mounting hole of the plate and the pipe.

16. The valve element opening/closing device according to claim 9, wherein the drive mechanism moves the valve element away from the valve seat to cause the opening part to bring into the open state and moves the valve element to abut with the valve seat to cause the opening part to bring into the closed state, and an abutting part of the valve element with the valve seat is formed of an elastic body.

17. The valve element opening/closing device according to claim 16, wherein the valve element is engaged with a slant face formed in a rotational member which is rotationally driven by the drive source, and the valve seat is provided with a valve element regulation part having a turning preventive function which restricts an operation of the valve element so as to move in an axial direction of the rotational member along the slant face of the rotational member when the rotational member is rotated.

18. The valve element opening/closing device according to claim 9, wherein the valve element is engaged with a slant face formed in a rotational member which is rotationally driven by the drive source, and the valve seat is provided with a valve element regulation part having a turning preventive function which restricts an operation of the valve element so as to move in an axial direction of the rotational member along the slant face of the rotational member when the rotational member is rotated.

* * * * *